Dec. 4, 1928.
F. LANG
1,694,269
INTERNAL COMBUSTION ENGINE
Filed April 3, 1925
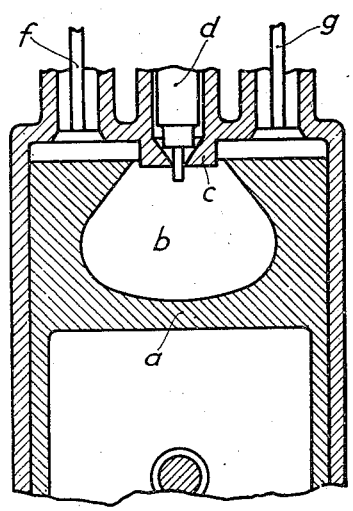
Inventor
Franz Lang.
By Stewart McKay
his attorneys.

Patented Dec. 4, 1928.

1,694,269

UNITED STATES PATENT OFFICE.

FRANZ LANG, OF MUNICH, GERMANY, ASSIGNOR TO ACRO AKTIENGESELLSCHAFT, OF KUESSNACHT-ON-THE-RIGI, SWITZERLAND.

INTERNAL-COMBUSTION ENGINE.

Application filed April 3, 1925, Serial No. 20,468, and in Germany April 4, 1924.

This invention relates to improvements in internal combustion engines and especially to combustion spaces for injection power engines with self-ignition, the characterizing feature being that one combustion chamber is provided in the piston head and communicates with another combustion chamber remaining even at the top center of the piston stroke within the cylinder by means of a throttling passage. This arrangement serves for the purpose of whirling the air while throttling the same into the first combustion chamber of facilitating the initiation of the self-ignition and of finally extending at the commencement of the working stroke the ignition to the remaining cylinder space.

By this arrangement the valves are spared and are kept free of combustion residues. Furthermore the degree of compression can be kept lower, while nevertheless an always positively acting self-ignition is insured.

In the accompanying drawing one form of construction of an improved combustion space is illustrated in vertical section.

Within the piston head *a* the first combustion chamber *b* is provided which is separated from the cylinder space by means of the body *c* of the injection valve *d* in such a manner that it is nearly completely closed by that injection valve body at the top center position of the piston stroke.

Thereby the air is whirled into the first combustion chamber during the compression so that the initiation of the self-ignition is facilitated. From the first combustion chamber the ignition is extended to the remaining cylinder space. As the principal combustion takes place within the first combustion chamber the valves *f*, *g* are kept free from combustion residues and are not injured by the high temperature of combustion.

I claim:

1. In an internal combustion engine, a combustion space, comprising a combustion chamber arranged in the piston head, said combustion chamber having its forward portion reduced to form a throat in combination with a second combustion chamber in the cylinder-head communicating with the first combustion chamber, and a fluid-injection valve arranged in the cylinder-head and arranged to project into the throat of the first chamber during the final portion of the stroke of the piston, so as to leave only a vertical passage between the two chambers, thereby imparting a whirling movement to gases present.

2. In an internal combustion engine, a combustion space comprising a combustion chamber arranged in the piston-head, said chamber having its forward portion reduced to form a sharp-edged throat, in combination with a second combustion chamber in the cylinder-head communicating with the first combustion chamber, and a fluid injection valve arranged in the cylinder-head, the body of said valve being sharp edged and arranged to enter the throat during the final portion of the piston stroke to throttle the communication between the two chambers.

3. In an internal combustion-engine, a combustion-chamber formed as a recess in the piston-head said recess formed with a reduced outlet or throat, in combination with a second combustion-chamber in the cylinder-head communicating with the first chamber, and throttling means between the two chambers and arranged to engage the throat of the first chamber during the final portion of the piston stroke, thereby imparting a whirling movement to gases present.

4. In an internal combustion engine, a combustion chamber arranged in the piston-head and formed with a sharp-edged throat or outlet, in combination with a second combustion chamber in the cylinder-head and a fluid-injection valve formed with lateral walls, so arranged to engage the said throat during the final portion of the piston-stroke.

5. In an internal combustion-engine, a combustion chamber arranged in the piston-head and formed with a reduced substantially narrow or sharp-edged throat or outlet, in combination with a second combustion chamber in the cylinder-head and a fluid injection-valve formed with lateral walls and so arranged as to engage the said throat during the final portion of the forward stroke of the piston.

6. In an internal combustion engine, a combustion-chamber arranged in the piston head, said chamber having forwardly converging walls and formed with a substantially narrow or sharp-edged throat or outlet, in combination with a second combustion chamber in the cylinder-head and a fluid injection valve formed with lateral walls and so arranged as to engage the said throat during the final portion of the forward stroke of the piston.

In testimony whereof I have hereunto affixed my signature.

FRANZ LANG.